(12) United States Patent
Varela

(10) Patent No.: US 10,513,177 B2
(45) Date of Patent: Dec. 24, 2019

(54) BOGIE AXLE SYSTEM

(71) Applicant: ArvinMeritor Technology, LLC, Troy, MI (US)

(72) Inventor: Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 12 days.

(21) Appl. No.: 15/499,368

(22) Filed: Apr. 27, 2017

(65) Prior Publication Data

US 2018/0312060 A1 Nov. 1, 2018

(51) Int. Cl.
| | |
|---|---|
| *F16H 37/08* | (2006.01) |
| *B60K 17/36* | (2006.01) |
| *B60B 35/12* | (2006.01) |
| *B60K 17/16* | (2006.01) |
| *B60B 35/14* | (2006.01) |
| *B60B 37/00* | (2006.01) |
| *B60B 35/00* | (2006.01) |

(52) U.S. Cl.
CPC ............ *B60K 17/36* (2013.01); *B60B 35/125* (2013.01); *B60K 17/165* (2013.01); *F16H 37/082* (2013.01); *B60B 35/003* (2013.01); *B60B 35/14* (2013.01); *B60B 37/00* (2013.01); *B60G 2200/318* (2013.01); *B60G 2206/0112* (2013.01); *B60Y 2200/14* (2013.01); *B60Y 2200/1422* (2013.01); *B60Y 2200/24* (2013.01); *B60Y 2200/41* (2013.01); *B60Y 2410/10* (2013.01)

(58) Field of Classification Search
CPC ..... B60K 17/36; B60K 17/165; F16H 37/082; F16H 1/28; F16H 57/082; F16H 37/065; B60G 5/00; B60G 2200/318; B60G 2206/0112; B60B 35/125; B60B 35/14; B60B 37/00; B60B 35/003; B60Y 2200/14; B60Y 2200/1422; B60Y 2200/41; B62D 11/10; B62D 11/12; B61F 5/26
USPC .............................. 180/905; 475/18, 28, 213
See application file for complete search history.

(56) References Cited

U.S. PATENT DOCUMENTS

| | | |
|---|---|---|
| 3,315,757 A | 4/1967 | Schlosser |
| 3,504,564 A | 4/1970 | Kell |
| 3,976,154 A | 8/1976 | Clark et al. |

(Continued)

FOREIGN PATENT DOCUMENTS

| | | |
|---|---|---|
| EP | 0520389 A2 | 12/1992 |
| EP | 2284395 A1 | 2/2011 |

(Continued)

OTHER PUBLICATIONS 777 parts.net, On-Line Catalog of Spare Parts for Caterpillar, Komatsu, Hitachi, John Deere, Tadano, JCB, Volvo, Doosan, Hyundai machinery, Rear Axle (Final Drive) (Planetary Gear) (Differential Lock Type)—Motor Grader GD655-3, Copyright 2012.

(Continued)

*Primary Examiner* — Jeffrey A Shapiro
(74) *Attorney, Agent, or Firm* — Brooks Kushman P.C.

(57) ABSTRACT

A bogie axle system having a slew bearing assembly that pivotally couples a chain housing to an axle housing. The slew bearing assembly includes a plurality of bearing elements that are received in a bearing groove of a spindle and that are disposed between the spindle and an outer race.

20 Claims, 4 Drawing Sheets

(56) References Cited

U.S. PATENT DOCUMENTS

| | | | |
|---|---|---|---|
| 4,131,169 A | 12/1978 | Eickhoff et al. | |
| 4,359,914 A * | 11/1982 | Meisel, Jr. | B62D 49/0635 475/331 |
| 4,560,018 A * | 12/1985 | Satzler | B60K 17/046 180/24.03 |
| 5,813,938 A | 9/1998 | Forster | |
| 5,820,270 A * | 10/1998 | Richardson | B66F 9/125 384/275 |
| 6,299,558 B1 | 10/2001 | Jensen | |
| 8,313,410 B2 | 11/2012 | Varela | |
| 9,759,289 B2 * | 9/2017 | Chung | F16H 37/065 |
| 9,862,231 B2 * | 1/2018 | Varela | B60B 35/125 |
| 2005/0279563 A1 | 12/2005 | Peterson | |
| 2008/0230284 A1 * | 9/2008 | Schoon | B60K 1/02 180/6.5 |
| 2015/0129229 A1 * | 5/2015 | Ring | E21B 43/26 166/308.1 |
| 2016/0167431 A1 | 6/2016 | Barbir | |
| 2017/0080752 A1 * | 3/2017 | Varela | B60B 35/125 |
| 2017/0082175 A1 * | 3/2017 | Chung | F16H 37/065 |
| 2018/0119797 A1 * | 5/2018 | DiSabatino | E02F 3/3681 |

FOREIGN PATENT DOCUMENTS

| | | |
|---|---|---|
| EP | 3144172 A1 | 3/2017 |
| EP | 3144561 A1 | 3/2017 |

OTHER PUBLICATIONS

5T7158 Final Drive Group—Motor Grader Caterpillar 16H—16H Motor Grader ATS00001-UP (Machine) Powered by 3196 Engine Power Train) 777 Parts, 777 parts.net—on line catalog of spare parts for Caterpillar, Komatsu, Hitachi, John Deere, Tadano, JCB, Volvo, Doosan, Hyundai machinery, Copyright 2012.

United States Patent and Trademark Office, U.S. Appl. No. 14/859,444, filed Sep. 21, 2015.

Disclosure Statement filed with application.

European Patent Office, Extended European Search Report for Application No. 18157564.8-1012, dated Sep. 17, 2018.

* cited by examiner

BOGIE AXLE SYSTEM

TECHNICAL FIELD

This disclosure relates to a bogie axle system.

BACKGROUND

A drive mechanism having bogies is disclosed in U.S. Pat. No. 6,299,558.

SUMMARY

In at least one embodiment, a bogie axle system is provided. The bogie axle system may include an axle housing, a planetary gear set, a drive sprocket unit, a chain housing, and a slew bearing assembly. The planetary gear set may be at least partially disposed in the axle housing and may provide torque to the drive sprocket unit. The chain housing may receive the drive sprocket unit. The slew bearing assembly may pivotally couple the chain housing to the axle housing. The slew bearing assembly may include an outer race, a spindle, and a plurality of bearing elements. The outer race may be fixedly positioned with respect to the chain housing. The spindle may be fixedly disposed on the axle housing and may have a bearing groove. The plurality of bearing elements may be received in the bearing groove. The bearing elements may be disposed between the spindle and the outer race.

In at least one embodiment, a bogie axle system is provided. The bogie axle system may include an axle housing, a planetary gear set, a drive sprocket unit, an input shaft, a chain housing, a slew bearing assembly, and a shield. The planetary gear set may be at least partially disposed in the axle housing. The planetary gear set may provide torque to the drive sprocket unit. The input shaft may be rotatable about an axis and may provide torque to the planetary gear set. The chain housing may receive the drive sprocket unit. The slew bearing assembly may pivotally couple the chain housing to the axle housing. The slew bearing assembly may include an outer race, a spindle, and a plurality of bearing elements. The outer race may be fixedly disposed with respect to the chain housing. The spindle may be fixedly disposed on the axle housing and may have a bearing groove. The plurality of bearing elements may be disposed between the spindle and the outer race and may be received in the bearing groove. The shield may extend between the spindle and the outer race to inhibit contaminants from entering the slew bearing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
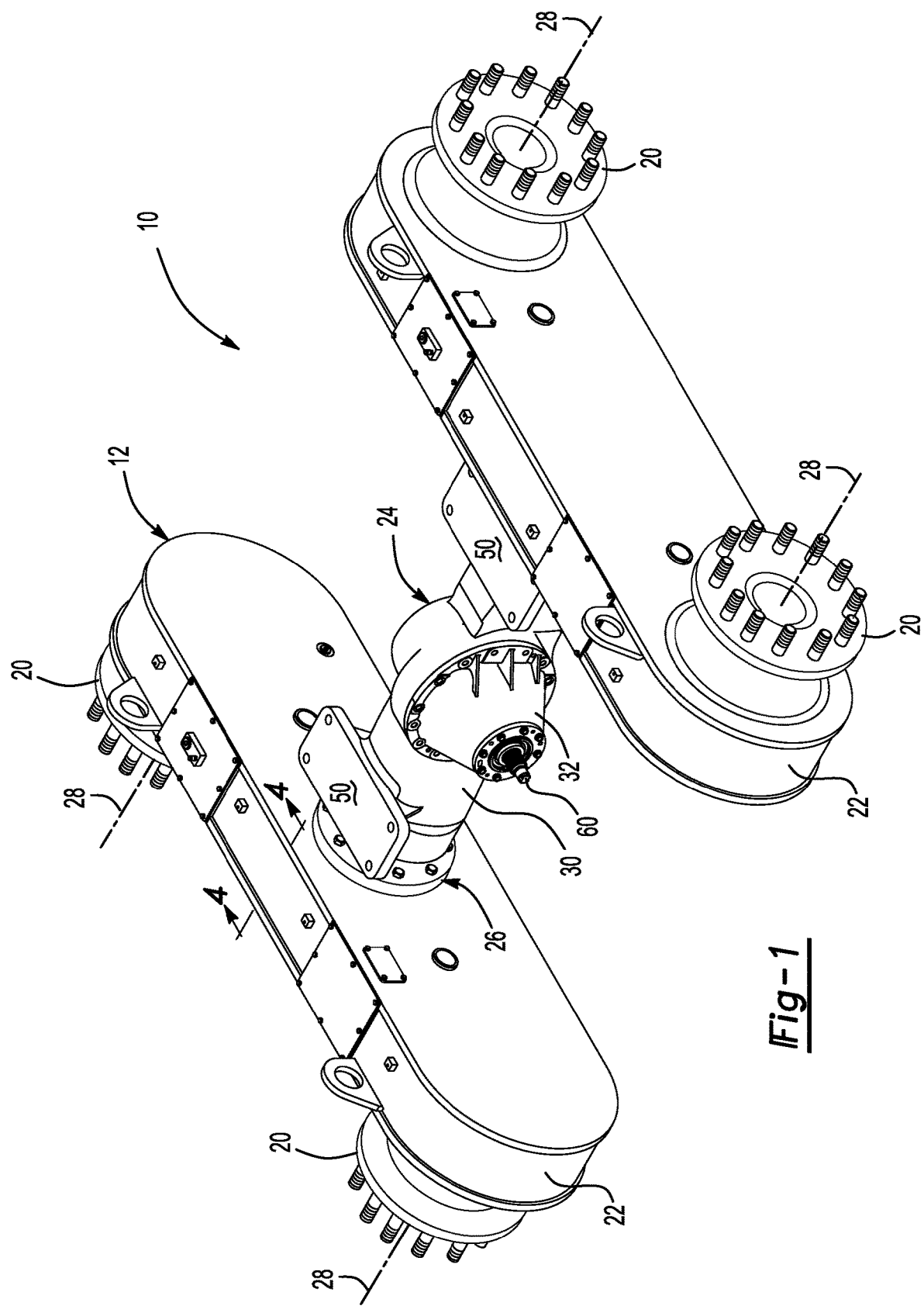
FIG. 1 is a perspective view of a bogie axle system.

Referring to FIG. 1, a bogie axle system 10 is shown. The bogie axle system 10 may be provided with a motor vehicle such as a truck, military transport or weaponry vehicle, or construction equipment like a grader. In at least one configuration, the bogie axle system 10 may include a plurality of wheel mounts 20, at least one chain housing 22, a bogie axle assembly 24, and a slew bearing assembly 26.

The wheel mount 20 may facilitate mounting of a wheel assembly to the bogie axle system 10. In at least one configuration, a wheel assembly may include a tire that may be mounted on a wheel. Each wheel mount 20 may rotate about a wheel axis 28 and may be operatively connected to the bogie axle assembly 24. In the configuration shown, two wheel mounts 20 are provided with each chain housing 22 such that the wheel mounts 20 may be disposed proximate opposite ends of the chain housing 22 and may extend away from the bogie axle assembly 24.

The chain housing 22, which may also be referred to as a chain box, may support one or more wheel mounts 20. The chain housing 22 may be configured as a generally hollow box that may receive sprockets of the wheel mounts 20 and sprockets of the bogie axle assembly 24 as well as chains that may operatively connect a sprocket of the bogie axle assembly 24 to a sprocket of a corresponding wheel mount 20. In FIG. 1, two chain housings 22 are shown that are disposed at opposite ends of the bogie axle assembly 24.

Figure 3:
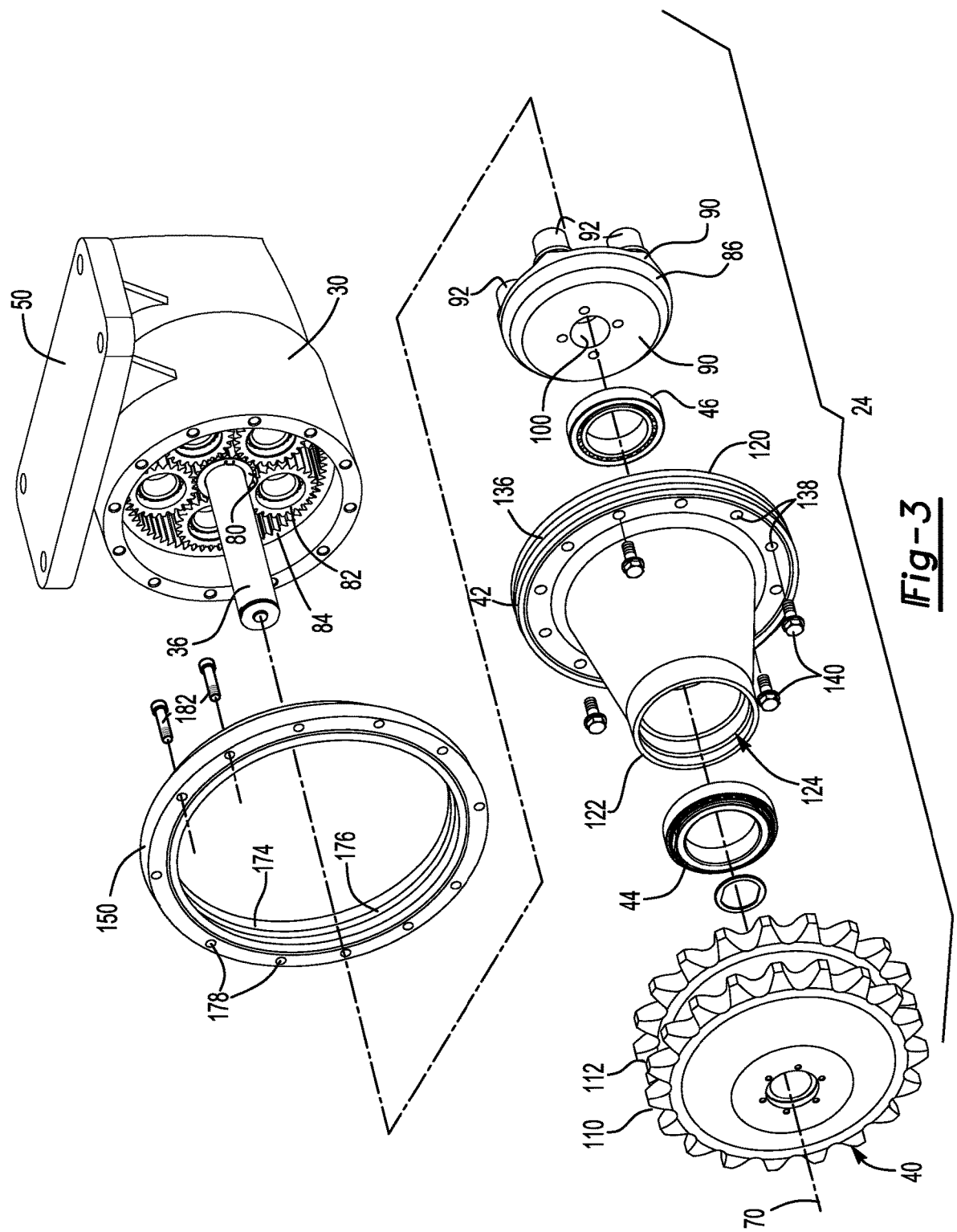
FIG. 3 is an exploded view of a portion of the bogie axle system with various components omitted for clarity.
Figure 4:
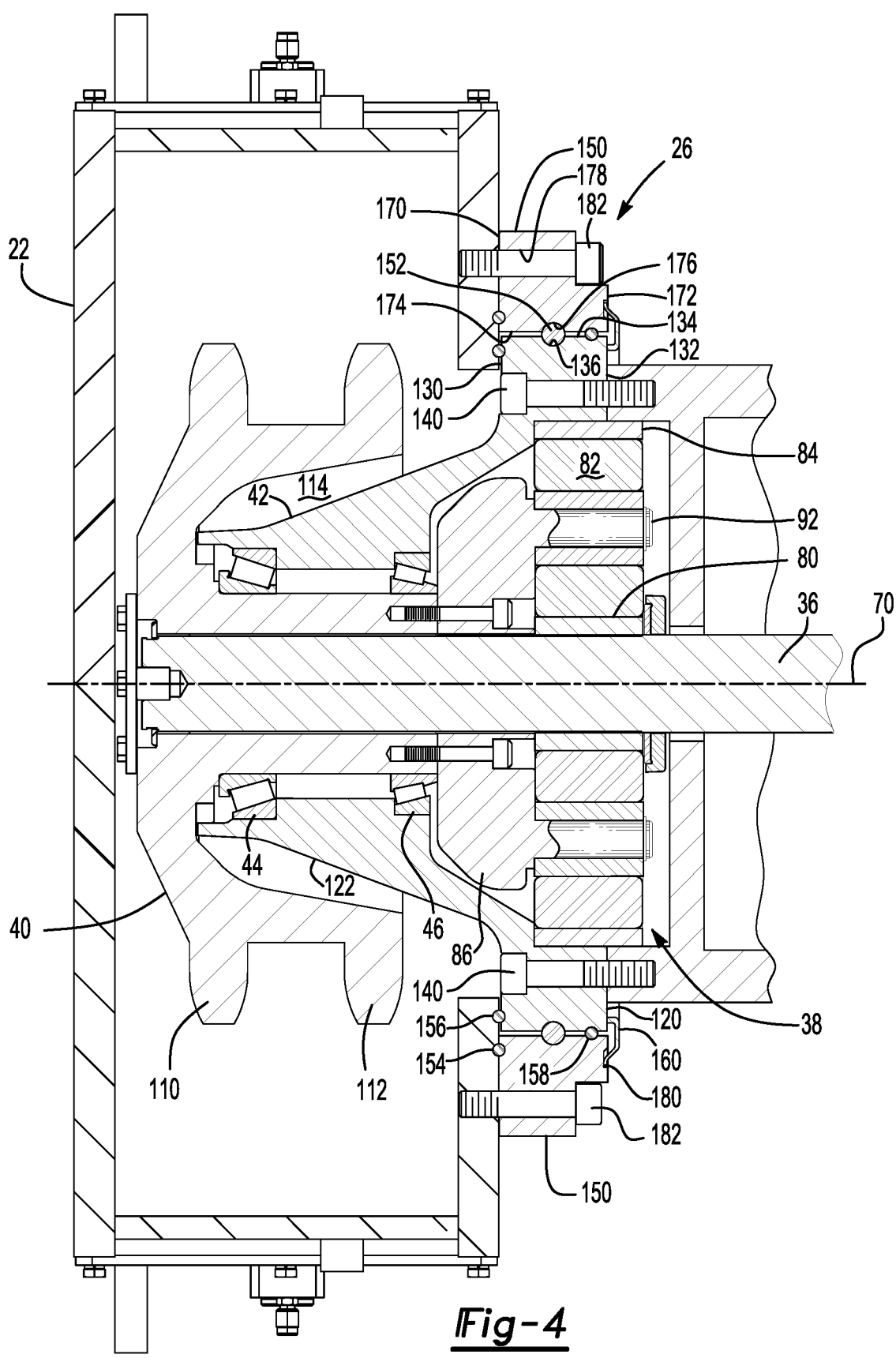
FIG. 4 is a section view of the bogie axle system along section line 4-4.

The bogie axle assembly 24 may extend between the chain housings 22. In addition, bogie axle assembly 24 may provide torque to one or more wheel assemblies via the wheel mounts 20. As is best shown in FIGS. 2-4, the bogie axle assembly 24 may include an axle housing 30, a differential carrier 32, a differential 34, one or more axle shafts 36, one or more planetary gear sets 38, a drive sprocket unit 40, a spindle 42, a first roller bearing assembly 44, and a second roller bearing assembly 46.

Figure 2:
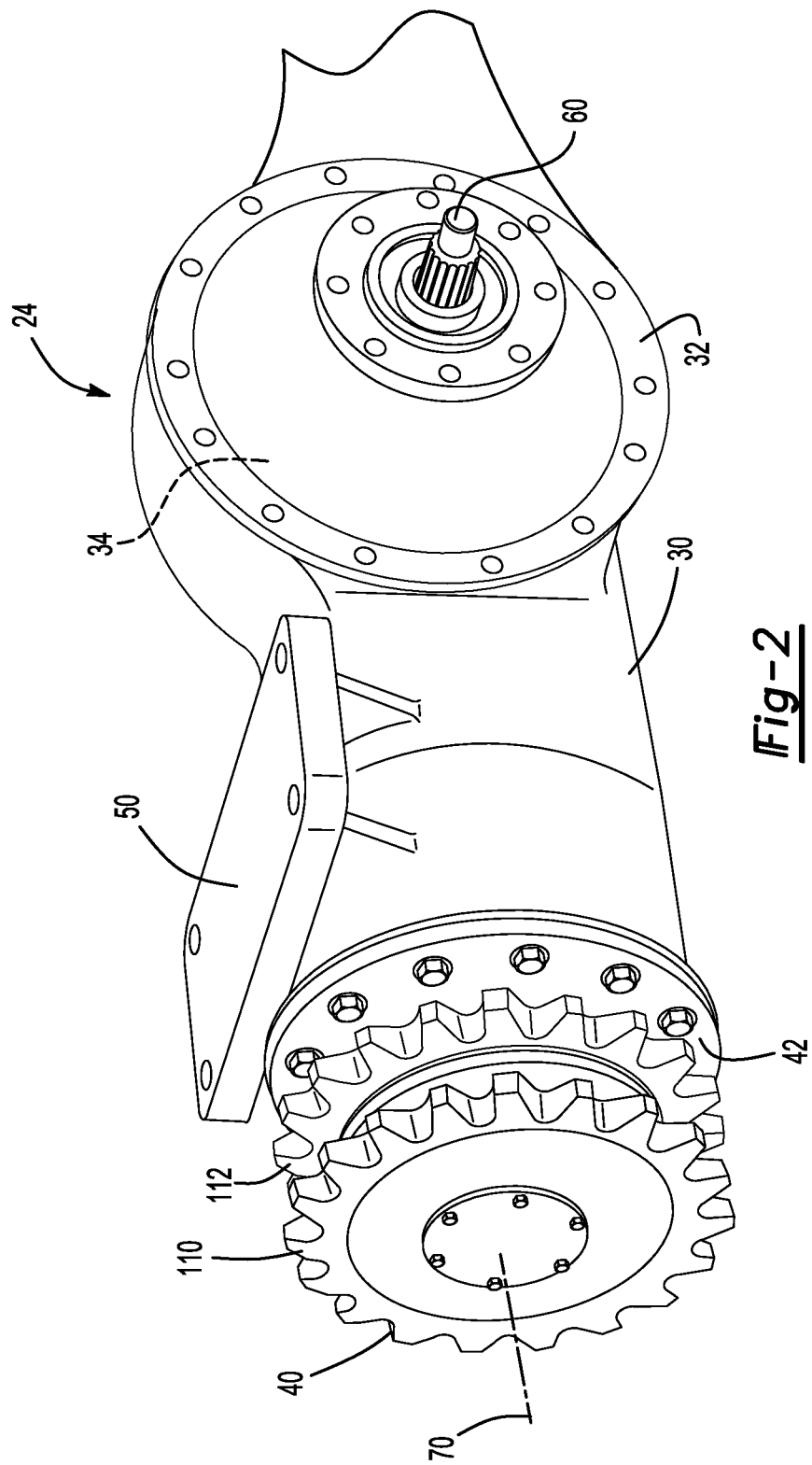
FIG. 2 is a perspective view of a portion of the bogie axle system.

Referring to FIGS. 1 and 2, the axle housing 30 may support components of the bogie axle assembly 24. In addition, the axle housing 30 may facilitate mounting of the bogie axle assembly 24 to the vehicle, such as via one or more mounting plates 50. The axle housing 30 may also include a center portion that may define an opening that may face toward the differential carrier 32 and a cavity that may receive at least a portion of the differential 34. The center portion may be disposed between the chain housings 22 and may be located proximate the center of the axle housing 30.

The differential carrier 32 may be mounted on the axle housing 30. For example, the differential carrier 32 may be mounted on the center portion with a plurality of fasteners, such as bolts. In addition, the differential carrier 32 may support the differential 34. For instance, the differential 34 may be mounted on the differential carrier 32 such that the differential carrier 32 and differential 34 may be installed or removed as a unit, or installed together onto the axle housing 30 or removed together from the axle housing 30.

The differential 34 may be disposed in the axle housing 30. The differential 34 may be configured to transmit torque to the wheel mounts 20 via a corresponding one axle shaft 36, planetary gear set 38 and drive sprocket unit 40. In addition, the differential 34 may be configured to permit the wheel mounts 20 associated with one chain housing 22 to rotate at a different velocity with respect to the wheel mounts 20 of the other chain housing 22. An input shaft 60 is shown in FIG. 2 to facilitate an abbreviated discussion of the operation of the differential 34.

The input shaft 60 may facilitate coupling of the bogie axle assembly 24 to a torque source. For example, the input shaft 60 may be coupled to a vehicle drivetrain component, such as a drive shaft, that may be coupled to an output of a vehicle transmission or transfer case, which in turn may receive torque from a vehicle power source, such as an engine or motor. The input shaft 60 may be rotatable about an axis and may be rotatably supported by one or more bearings that may be disposed in the differential carrier 32 and may be operatively connected to a drive pinion. The drive pinion may provide torque to a ring gear. The ring gear may transmit torque to a plurality of differential gears, which in turn may transmit torque to and may be operatively connected to one or more axle shafts 36, such as is shown in FIG. 3 and to the planetary gear set 38.

Referring to FIGS. 3 and 4, the axle shaft 36 may transmit torque from the differential 34 to a planetary gear set 38. The axle shaft 36 may be at least partially disposed in the axle housing 30 and may extend along and may be rotated about an axis 70 by the differential 34. The axle shaft 36 may extend through the planetary gear set 38. The axle shaft 36 may have a first end and a second end. The first end may be operatively connected to the differential 34. The second end may be disposed opposite the first end. The second end may be disposed in the chain housing 22 in one or more embodiments.

The planetary gear set 38 may be at least partially disposed in the axle housing 30 and may be configured to provide torque to the drive sprocket unit 40 and provide a desired gear reduction ratio. The planetary gear set 38 may include a sun gear 80, a plurality of planet pinions 82, a ring gear 84, and a planet carrier 86.

The sun gear 80 may be disposed proximate the center of the planetary gear set 38. The sun gear 80 may be disposed on the axle shaft 36 such that the sun gear 80 may rotate about the axis 70 with the axle shaft 36. For example, the sun gear 80 and axle shaft 36 may have mating splines that inhibit rotation of the sun gear 80 about the axis 70 with respect to the axle shaft 36.

The planet pinions 82, which may also be called planet gears, may be rotatably disposed on the planet carrier 86 between the sun gear 80 and the ring gear 84. Teeth on each planet pinion 82 may mesh with teeth on the sun gear 80 and the ring gear 84.

The ring gear 84 may be disposed in the axle housing 30, the spindle 42, or both. For example, the ring gear 84 may be disposed between the axle housing 30 and the planet pinions 82. An outside circumference of the ring gear 84 may be disposed proximate and may engage the axle housing 30, the spindle 42, or both the axle housing 30 and the spindle 42. In addition, the ring gear 84 may be fixedly positioned with respect to the axle housing 30.

The planet carrier 86 may be coupled to the planet pinions 82. The planet carrier 86 may be provided in various configurations. As is best shown in FIG. 3, the planet carrier 86 may have a body portion 90 and one or more hubs 92.

The body portion 90 may be at least partially received inside the spindle 42. The body portion 90 may have an inner surface that may at least partially define a planet carrier hole 100 through which the axle shaft 36 may extend. The inner surface may be spaced apart from and may not engage the axle shaft 36.

One or more hubs 92 may be operatively connected to corresponding planet pinions 82. For example, a hub 92 may extend from the body portion 90 and may be received in a corresponding planet pinion 82 to help support and position a corresponding planet pinion 82. A roller bearing may be disposed between a hub 92 and a corresponding planet pinion 82 to facilitate rotation of the planet pinion 82 with respect to the hub 92 in one or more configurations. The hubs 92 may be integrally formed with the body portion 90 or may be provided as separate components that are assembled to the body portion 90.

Referring to FIGS. 2-4, the drive sprocket unit 40 may be disposed at an end of the bogie axle assembly 24 and may be received in the chain housing 22. The drive sprocket unit 40 may include one or more sprockets that may support and actuate another component, such as a chain, that may couple the drive sprocket unit 40 a sprocket of a corresponding wheel mount 20. It is also contemplated that the drive sprocket unit 40 may be connected to a wheel mount 20 with one or more gears rather than with a chain, in which case the teeth of the drive sprocket unit 40 may have teeth that may be suitable for meshing with another gear. The drive sprocket unit 40 may be fixedly positioned with respect to the planet carrier 86 or may be fixedly disposed on the planet carrier 86. For instance, the drive sprocket unit 40 may be fixedly disposed on the planet carrier 86 in any suitable manner, such as with mating splines, fasteners such as bolts or bolts and dowel pins, or combinations thereof. The drive sprocket unit 40 may include an outer sprocket 110 and an inner sprocket 112.

The outer sprocket 110 and the inner sprocket 112 may each have a plurality of sprocket teeth that may be arranged around the axis 70. The sprocket teeth may extend away from the axis 70 and be configured to engage a corresponding chain or gear. The sprocket teeth of the outer sprocket 110 may be positioned further from the axle housing 30 than the sprocket teeth of the inner sprocket 112. The outer sprocket 110 may be integrally formed with the inner sprocket 112 or the outer sprocket 110 and the inner sprocket 112 may be provided as separate components that may be fastened together.

The spindle 42 may be fixedly disposed on the axle housing 30 or fixedly positioned with respect to the axle housing 30. For example, the spindle 42 may be mounted to the axle housing 30 in any suitable manner, such as with one or more fasteners like bolts. In addition, the spindle 42 may be configured to help position and/or support the first roller bearing assembly 44 and/or the second roller bearing assembly 46. In at least one configuration, the spindle 42 may extend from the axle housing 30 into a cavity 114 of the drive sprocket unit 40 and into the chain housing 22. In addition, the spindle 42 may extend around at least a portion of the drive sprocket unit 40 and the planet carrier 86 and may rotatably support the drive sprocket unit 40. The spindle 42 may include a mounting flange 120, a spindle tube portion 122, and a spindle hole 124.

The mounting flange 120 may facilitate coupling of the spindle 42 to the axle housing 30 as will be discussed more detail below. The mounting flange 120 may extend around the axis 70 and may extend further from the axis 70 than the spindle tube portion 122.

The mounting flange 120 of the spindle 42 may be part of the slew bearing assembly 26. The slew bearing assembly 26 may pivotally couple the chain housing 22 to the axle housing 30. As such, the slew bearing assembly 26 may allow the chain housing 22 to rotate about the axis 70 with respect to the axle housing 30.

Referring to FIG. 4, the mounting flange 120 may have a first mounting flange side surface 130, a second mounting flange side surface 132, an outer side 134, a bearing groove 136, and a plurality of fastener holes 138.

The first mounting flange side surface 130 may face toward and may engage the chain housing 22. The first mounting flange side surface 130 may be disposed outside of the axle housing 30.

The second mounting flange side surface 132 may be disposed opposite the first mounting flange side surface 130. As such, the second mounting flange side surface 132 may face toward and may engage the axle housing 30. A portion of the second mounting flange side surface 132 may be disposed outside of the axle housing 30. The second mounting flange side surface 132 may be disposed substantially parallel to the first mounting flange side surface 130 in one or more configurations.

The outer side 134 may extend between the first mounting flange side surface 130 to the second mounting flange side surface 132. The outer side 134 may be disposed outside of the chain housing 22 and the axle housing 30 and may face away from the axis 70.

The bearing groove 136 may extend from the outer side 134 toward the axis 70. The bearing groove 136 may partially receive a plurality of bearing elements as will be discussed in more detail below. In the configuration shown, the bearing groove 136 is depicted with a substantially semicircular cross-section; however, it is contemplated that the bearing groove 136 may be provided with other configurations that are compatible with the bearing elements.

Referring to FIG. 3, the fastener holes 138 may be through holes that may extend from the first mounting flange side surface 130 to the second mounting flange side surface 132. The fastener holes 138 may be arranged around the axis 70 and may be spaced apart from each other. Each fastener hole 138 may receive a corresponding fastener 140, such as a bolt, that may couple the spindle 42 to the axle housing 30.

Referring to FIGS. 3 and 4, the spindle tube portion 122 may extend from the mounting flange 120 in a direction the may extend axially away from axle housing 30. The spindle tube portion 122 may have an inner spindle surface that may at least partially define the spindle hole 124. The spindle hole 124 may receive the first roller bearing assembly 44, the second roller bearing assembly 46, and a portion of the drive sprocket unit 40 and the axle shaft 36.

Referring to FIGS. 3 and 4, the slew bearing assembly 26 may also include an outer race 150, a plurality of bearing elements 152, a first seal 154, a second seal 156, a third seal 158, and a shield 160.

The outer race 150 fixedly positioned with respect to the chain housing 22. For example, the outer race 150 may be fixedly disposed on and may engage the chain housing 22. In addition, the outer race 150 may be disposed outside of the chain housing 22 and the axle housing 30. For instance, the outer race 150 may be disposed on a side of the chain housing 22 that faces toward the bogie axle assembly 24. The outer race 150 may extend continuously around the axis 70 and the mounting flange 120 such that the mounting flange 120 may be received between the outer race 150 and the ring gear 84.

The outer race 150 may have a multi piece configuration to facilitate assembly to the chain housing 22 and installation of the bearing elements 152. For instance, the outer race 150 may be split in an axial direction or in a non-axial direction. For example, the outer race 150 may be split in a direction that extends parallel to the axis 70 into semicircular rings or may be split in a plane disposed perpendicular to the axis 70 into two thinner rings. The outer race 150 may have a first outer race side surface 170, a second outer race side surface 172, an inner side 174, a bearing groove 176, and a plurality of fastener holes 178.

Referring to FIG. 4, the first outer race side surface 170 may face toward and may engage the chain housing 22. The first outer race side surface 170 may be disposed outside of the axle housing 30.

The second outer race side surface 172 may be disposed opposite the first outer race side surface 170. The second outer race side surface 172 may face toward but may not engage the axle housing 30. In addition, the second outer race side surface 172 may be disposed outside of the axle housing 30. As is best shown in FIG. 4, the second outer race side surface 172 may have an annular groove 180. The annular groove 180 may extend continuously around the axis 70 and may be an indentation that extends from the second outer race side surface 172 toward the first outer race side surface 170.

The inner side 174 may extend from the first outer race side surface 170 to the second outer race side surface 172. The inner side 174 may face toward and may be spaced apart from the outer side 134. The inner side 174 may be disposed outside of the chain housing 22 and the axle housing 30.

The bearing groove 176 may extend from the inner side 174 away from the axis 70. The bearing groove 176 may partially receive and help contain the bearing elements 152. In the configuration shown, the bearing groove 176 is depicted with a substantially semicircular cross-section; however, it is contemplated that the bearing groove 176 may be provided with other configurations that are compatible with the bearing elements 152.

Referring to FIG. 3, the fastener holes 178 may be through holes that may extend from the first outer race side surface 170 to the second outer race side surface 172. The fastener holes 178 may be arranged around the axis 70 and may be spaced apart from each other. Each fastener hole 178 may receive a corresponding fastener 182, such as a bolt, that may couple the outer race 150 to the chain housing 22.

The bearing elements 152 may facilitate rotational or pivotal movement of the outer race 150 and the chain housing 22 about the axis 70 and with respect to the spindle 42 and the axle housing 30. The bearing elements 152 may be received in the bearing groove 136 of the mounting flange 120 of the spindle 42 and the bearing groove 176 of the outer race 150. As such, the bearing elements 152 may be axially positioned between the third seal 158 and the first and second seals 154, 156 and may be radially positioned between the first seal 154 and the second seal 156. A plurality of bearing elements 152 may be arranged around the axis 70. For instance, the bearing elements may be arranged around the mounting flange 120 of the spindle 42 and the ring gear 84 and may rotatably support the outer race 150. The bearing elements 152 may have any suitable configuration. In FIG. 4, the bearing elements 152 are depicted as ball bearings; however, it is contemplated that other configurations may be provided, such as roller bearings.

Referring to FIG. 4, the first seal 154 may inhibit contaminants from entering the slew bearing assembly 26 and may help retain lubricant near the bearing elements 152. The first seal 154 may be positioned between the chain housing 22 and the outer race 150. For example, the first seal 154 may extend from the chain housing 22 to the first outer race side surface 170. The first seal 154 may extend continuously around the axis 70 and may have any suitable configuration. For instance, the first seal 154 may be configured as an O-ring. In addition, the chain housing 22 may rotate about the axis 70 with respect to the first seal 154 in one or more configurations.

The second seal 156 may help retain lubricant near the bearing elements 152. The second seal 156 may be positioned between the chain housing 22 and the spindle 42. For example, the second seal 156 may extend from the chain housing 22 to the first mounting flange side surface 130 of the mounting flange 120 of the spindle 42. The second seal 156 may extend continuously around the axis 70 and may be disposed closer to the axis 70 than the first seal 154. The second seal 156 may have any suitable configuration. For instance, the second seal 156 may be configured as an O-ring. In addition, the chain housing 22 may rotate about the axis 70 with respect to the second seal 156 in one or more configurations.

The third seal 158 may also inhibit contaminants from entering the slew bearing assembly 26 and may help retain lubricant near the bearing elements 152. The third seal 158 may be positioned between the spindle 42 and the outer race 150. For example, the third seal 158 may extend from the outer side 134 of the mounting flange 120 of the spindle 42 to the inner side 174 of the outer race 150. The third seal 158 may extend continuously around the axis 70 and may be disposed closer to the axis 70 than the first seal 154 and further from the axis 70 than the second seal 156. The third seal 158 may be axially located between the bearing elements 152 and the second mounting flange side surface 132 and the second outer race side surface 172. As such, third seal 158 may be axially positioned between the bearing elements 152 and the shield 160. The third seal 158 may have any suitable configuration. For instance, the third seal 158 may be configured as an O-ring. In addition, the outer race 150 may rotate about the axis 70 with respect to the third seal 158 in one or more configurations.

The shield 160 may help protect the third seal 158. For example, the shield 160 may help block or inhibit contaminants, such as particulates like dust and dirt, from entering the slew bearing assembly 26. The shield may be disposed on the outside of the slew bearing assembly 26 and may be disposed opposite the chain housing 22. The shield 160 may be configured as a ring that may extend continuously around the axle housing 30 and may be spaced apart from the axle housing 30 in one or more configurations. For example, the shield 160 may be disposed on the second mounting flange side surface 132 and the second outer race side surface 172 and thus may extend from the spindle 42 to the outer race 150 and may be disposed opposite the chain housing 22. In at least one configuration, a portion of the shield 160 or an end of the shield 160 may be received in the annular groove 180 of the outer race 150. Optionally, a shield seal may be provided at the end of the shield 160. For example, a shield seal may be molded onto the end of the shield 160 that may be received in the annular groove 180 and may engage the outer race 150 to help further prevent contaminants from passing around the shield 160.

The first roller bearing assembly 44 may be disposed in the chain housing 22. The first roller bearing assembly 44 may include a plurality of rolling elements, such as balls or rollers, which may be disposed between an inner race and an outer race. The inner race may be disposed on the drive sprocket unit 40. The outer race may be disposed on the spindle 42. As such, the first roller bearing assembly 44 may be received inside of the spindle 42.

The second roller bearing assembly 46 may be spaced apart from the first roller bearing assembly 44. The second roller bearing assembly 46 may be disposed in the chain housing 22. The second roller bearing assembly 46 may include a plurality of rolling elements, such as balls or rollers, which may be disposed between an inner race and an outer race. The inner race may be disposed on the drive sprocket unit 40. The outer race may be disposed on the spindle 42. As such, the second roller bearing assembly 46 may be received inside of the spindle 42. The second roller bearing assembly 46 may be axially positioned between the first roller bearing assembly 44 and the end surface of the planet carrier 86 such that the planet carrier 86 may inhibit axial movement of the second roller bearing assembly 46.

The bogey axle system and slew bearing assembly configurations described above may help rotatably support a chain housing in a manner that improves vehicle ride quality. For instance, the plurality of bearing elements may reduce friction and allow smooth rotation of the chain housing about the axis. The bearing elements may also allow the outer face of the mounting flange and the inner face of the outer race to be positioned close to each other, thereby reducing the gap between the spindle and the outer race to improve seal performance or provide improved sealing. In addition, the slew bearing assembly may hold a substantial volume of lubricant, which may be contained or trapped by the seals, to extend maintenance intervals or the amount of time before the lubricant should be replenished or replaced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bogie axle system comprising:
   an axle housing;
   a planetary gear set that is at least partially disposed in the axle housing and that provides torque to a drive sprocket unit;
   a chain housing that receives the drive sprocket unit;
   a slew bearing assembly that pivotally couples the chain housing to the axle housing, the slew bearing assembly including:
   an outer race that is fixedly positioned with respect to the chain housing;
   a spindle that is fixedly disposed on the axle housing and that has a bearing groove; and
   a plurality of bearing elements that are received in the bearing groove and are disposed between the spindle and the outer race; and
   a shield that extends between the spindle and the outer race to inhibit contaminants from entering the slew bearing assembly.

2. The bogie axle system of claim 1 wherein the bearing elements are arranged around the spindle and a ring gear of the planetary gear set.

3. The bogie axle system of claim 1 wherein the planetary gear set includes a ring gear and the ring gear is received inside the spindle.

4. The bogie axle system of claim 1 further comprising a first seal that extends from the chain housing to the outer race.

5. The bogie axle system of claim 4 further comprising a second seal that extends from the spindle to the chain housing.

6. The bogie axle system of claim 5 further comprising a third seal that extends from the spindle to the outer race.

7. The bogie axle system of claim 6 wherein the bearing elements are disposed between the first seal and the third seal.

8. The bogie axle system of claim 5 wherein the bearing elements are disposed between the second seal and the first seal.

9. The bogie axle system of claim 1 wherein the outer race is disposed outside of the axle housing and outside of the chain housing and at least one roller bearing assembly that rotatably supports the drive sprocket unit is received inside the spindle.

10. A bogie axle system comprising:
    an axle housing;
    a planetary gear set that is at least partially disposed in the axle housing and that provides torque to a drive sprocket unit;
    an input shaft that is rotatable about an axis and provides torque to the planetary gear set;
    a chain housing that receives the drive sprocket unit;
    a slew bearing assembly that pivotally couples the chain housing to the axle housing, the slew bearing assembly including:
        an outer race that is fixedly disposed with respect to the chain housing;
        a spindle that is fixedly disposed on the axle housing and that has a bearing groove; and
        a plurality of bearing elements that are received in the bearing groove and are disposed between the spindle and the outer race; and
    a shield that extends between the spindle and the outer race to inhibit contaminants from entering the slew bearing assembly.

11. The bogie axle system of claim 10 wherein the shield extends continuously around the axle housing.

12. The bogie axle system of claim 10 wherein the shield is spaced apart from the axle housing.

13. The bogie axle system of claim 10 wherein the shield is disposed opposite the chain housing.

14. The bogie axle system of claim 13 wherein the spindle has a mounting flange that is disposed on the axle housing, wherein the mounting flange has a first mounting flange side surface that faces toward the chain housing and a second mounting flange side surface that is disposed opposite the first mounting flange side surface, wherein the shield is disposed on the second mounting flange side surface.

15. The bogie axle system of claim 14 wherein the mounting flange has an outer side that faces away from the axis, wherein the bearing groove extends from the outer side toward the axis.

16. The bogie axle system of claim 14 wherein a second seal is disposed between the chain housing and the first mounting flange side surface.

17. The bogie axle system of claim 14 wherein the outer race has a first outer race side surface that faces toward the chain housing and a first seal is disposed on the first outer race side surface.

18. The bogie axle system of claim 17 wherein the shield is disposed on the second mounting flange side surface.

19. The bogie axle system of claim 18 wherein the outer race has a second outer race side surface that is disposed opposite the first outer race side surface, and the second outer race side surface has an annular groove that extends around the axis and receives the shield.

20. The bogie axle system of claim 10 wherein a third seal is axially disposed between the plurality of bearing elements and the shield.

* * * * *